US008987357B2

(12) United States Patent
Cristadoro et al.

(10) Patent No.: US 8,987,357 B2
(45) Date of Patent: Mar. 24, 2015

(54) THERMOPLASTIC MOLDING COMPOSITION

(75) Inventors: Anna Cristadoro, Heppenheim (DE); Alexander König, Bruchsal (DE); Michael Roth, Lautertal (DE)

(73) Assignee: BASF SE (DE)

( * ) Notice: Subject to any disclaimer, the term of this patent is extended or adjusted under 35 U.S.C. 154(b) by 98 days.

(21) Appl. No.: 13/481,402

(22) Filed: May 25, 2012

(65) Prior Publication Data

US 2012/0302677 A1 Nov. 29, 2012

Related U.S. Application Data

(60) Provisional application No. 61/490,639, filed on May 27, 2011.

(51) Int. Cl.
| | |
|---|---|
| *C08K 5/34* | (2006.01) |
| *C08K 5/5377* | (2006.01) |
| *C08K 5/521* | (2006.01) |
| *C08K 7/14* | (2006.01) |
| *C08L 77/06* | (2006.01) |
| *C08L 79/08* | (2006.01) |
| *C09D 177/02* | (2006.01) |
| *C09D 177/06* | (2006.01) |
| *C08L 77/02* | (2006.01) |
| *C08K 3/38* | (2006.01) |
| *C08K 5/00* | (2006.01) |
| *C08K 5/5313* | (2006.01) |
| *C08K 3/02* | (2006.01) |

(52) U.S. Cl.
CPC .............. *C08L 77/06* (2013.01); *C09D 177/02* (2013.01); *C09D 177/06* (2013.01); *C08L 77/02* (2013.01); *C08K 3/38* (2013.01); *C08K 5/0066* (2013.01); *C08K 5/5313* (2013.01); *C08K 7/14* (2013.01); *C08K 2003/026* (2013.01)
USPC ............. 524/86; 524/100; 524/133; 524/135; 524/414; 524/538; 524/539

(58) Field of Classification Search
USPC ............ 524/86, 538, 539, 100, 133, 135, 414
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,155,687 A | 4/1939 | Schauer | |
| 2,241,322 A | 5/1941 | Hanford | |
| 2,312,966 A | 3/1943 | Hanford | |
| 2,512,606 A | 6/1950 | Bolton et al. | |
| 3,277,117 A | 10/1966 | Van Strien | |
| 3,393,210 A | 7/1968 | Speck | |
| 4,537,949 A | 8/1985 | Schmidt et al. | |
| 4,540,772 A | 9/1985 | Pipper et al. | |
| 4,614,782 A * | 9/1986 | Nishizawa et al. | ........... 525/424 |
| 5,081,222 A | 1/1992 | Reimann et al. | |
| 5,326,805 A | 7/1994 | Sicken et al. | |
| 6,194,538 B1 | 2/2001 | Weiss et al. | |
| 6,365,071 B1 | 4/2002 | Jenewein et al. | |
| 6,699,960 B1 | 3/2004 | Ohlbach et al. | |
| 7,118,798 B2 * | 10/2006 | Goda et al. | ..................... 428/209 |
| 8,436,125 B2 | 5/2013 | Cristadoro et al. | |
| 8,450,407 B2 | 5/2013 | Prusty et al. | |
| 8,466,250 B2 | 6/2013 | Bruchmann et al. | |
| 8,492,497 B2 | 7/2013 | Al-Hellani et al. | |
| 8,563,680 B2 | 10/2013 | Prusty et al. | |
| 8,574,520 B2 | 11/2013 | Koplin et al. | |
| 8,575,295 B2 | 11/2013 | Roth et al. | |

(Continued)

FOREIGN PATENT DOCUMENTS

| | | |
|---|---|---|
| DE | 19614424 A1 | 10/1997 |
| DE | 10313681 A1 | 10/2004 |
| EP | 38 094 A2 | 10/1981 |
| EP | 38 582 A2 | 10/1981 |
| EP | 39 524 A1 | 11/1981 |
| EP | 129195 A2 | 12/1984 |
| EP | 129196 A2 | 12/1984 |
| EP | 299444 A2 | 1/1989 |
| EP | 0 547 809 A1 | 6/1993 |
| EP | 584567 A2 | 3/1994 |

(Continued)

OTHER PUBLICATIONS

European Search Report for EP 11167954, dated Oct. 14, 2011.

*Primary Examiner* — Kriellion Sanders
(74) *Attorney, Agent, or Firm* — Drinker Biddle & Reath LLP

(57) ABSTRACT

The present invention relates to a thermoplastic molding composition comprising the following components:

A) 20 to 98.99% by weight of at least one polyamide,

B) 0.01 to 40% by weight of at least one branched polyimide selected from condensates of either b1) at least one polyisocyanate having an average of more than two isocyanate groups per molecule or b2) at least one polyamine having an average of more than two amino groups per molecule and b3) at least one polycarboxylic acid having at least three COOH groups per molecule or its anhydride C) 1 to 59% by weight of at least one flame retardant selected from the group of c1) phosphorus-containing flame retardants c2) nitrogen-containing flame retardants and mixtures of these, D) 0 to 50% by weight of further additives, where the total of the proportions by weight is 100% by weight based on the molding composition.

9 Claims, No Drawings

(56) References Cited

U.S. PATENT DOCUMENTS

| | | |
|---|---|---|
| 2001/0005745 A1 | 6/2001 | Kersjes et al. |
| 2006/0033225 A1 | 2/2006 | Wang |
| 2006/0235191 A1 | 10/2006 | Deininger et al. |
| 2008/0269383 A1* | 10/2008 | Pauquet et al. .............. 524/120 |
| 2010/0009206 A1 | 1/2010 | Ataka et al. |
| 2011/0178241 A1 | 7/2011 | Schonfelder et al. |
| 2011/0293374 A1 | 12/2011 | Mohmeyer et al. |
| 2011/0294929 A1* | 12/2011 | Cristadoro et al. ............ 524/94 |
| 2011/0311901 A1 | 12/2011 | Fleischhaker et al. |
| 2012/0010312 A1 | 1/2012 | Balbo Block et al. |
| 2012/0052397 A1 | 3/2012 | Mikhaylik et al. |
| 2012/0053057 A1 | 3/2012 | Cristadoro et al. |
| 2012/0082629 A1 | 4/2012 | Turk et al. |
| 2012/0108712 A1 | 5/2012 | Xalter et al. |
| 2012/0190756 A1 | 7/2012 | Turk et al. |
| 2012/0190781 A1 | 7/2012 | Konig et al. |
| 2012/0197042 A1 | 8/2012 | Schoenfelder et al. |
| 2012/0259044 A1 | 10/2012 | Henningsen et al. |
| 2012/0264856 A1 | 10/2012 | Xue et al. |
| 2012/0277354 A1 | 11/2012 | Konig et al. |
| 2012/0289634 A1 | 11/2012 | Konig |
| 2012/0302677 A1 | 11/2012 | Cristadoro et al. |
| 2013/0059952 A1 | 3/2013 | Pfaendner et al. |
| 2013/0310494 A1 | 11/2013 | Xue et al. |

FOREIGN PATENT DOCUMENTS

| | | |
|---|---|---|
| EP | 0921 161 A1 | 6/1999 |
| EP | 922065 A2 | 6/1999 |
| EP | 1095030 A1 | 5/2001 |
| EP | 1198491 A1 | 4/2002 |
| WO | WO-2004/072032 A2 | 8/2004 |
| WO | WO-2005/118698 A1 | 12/2005 |
| WO | WO-2009/036018 A2 | 3/2009 |
| WO | WO-2011/003773 A1 | 1/2011 |
| WO | WO-2011/006838 A2 | 1/2011 |
| WO | WO-2011/045357 A1 | 4/2011 |
| WO | WO-2011/051121 A1 | 5/2011 |
| WO | WO-2011/073120 A1 | 6/2011 |
| WO | WO-2011/086114 A1 | 7/2011 |
| WO | WO-2011/089078 A1 | 7/2011 |
| WO | WO-2011/144726 A1 | 11/2011 |
| WO | WO-2011/147723 A1 | 12/2011 |
| WO | WO-2011/147724 A1 | 12/2011 |
| WO | WO-2011/151775 A1 | 12/2011 |
| WO | WO-2011/157615 A1 | 12/2011 |
| WO | WO-2012/025543 A1 | 3/2012 |
| WO | WO-2012/028527 A1 | 3/2012 |
| WO | WO-2012/029038 A1 | 3/2012 |
| WO | WO-2012/052370 A1 | 4/2012 |
| WO | WO-2012/080403 A1 | 6/2012 |
| WO | WO-2012/098035 A1 | 7/2012 |
| WO | WO-2012/098185 A1 | 7/2012 |
| WO | WO-2012098176 A1 | 7/2012 |
| WO | WO-2012/136273 A1 | 10/2012 |
| WO | WO-2012/139990 A1 | 10/2012 |
| WO | WO-2012/146624 A1 | 11/2012 |
| WO | WO-2012/152805 A1 | 11/2012 |
| WO | WO-2012/156903 A1 | 11/2012 |
| WO | WO-2012/163680 A1 | 12/2012 |

* cited by examiner

THERMOPLASTIC MOLDING COMPOSITION

CROSS-REFERENCE TO RELATED APPLICATIONS

This application claims the benefit of U.S. Provisional Application 61/490,639, filed May 27, 2011, which is incorporated by reference.

The present invention relates to a thermoplastic molding composition comprising the following components:
A) from 20 to 98.99% by weight of at least one polyamide,
B) from 0.01 to 40% by weight of at least one branched polyimide selected from condensates of either
  b1) at least one polyisocyanate having an average of more than two isocyanate groups per molecule or
  b2) at least one polyamine having an average of more than two amino groups per molecule and
  b3) at least one polycarboxylic acid having at least three COOH groups per molecule or its anhydride,
C) from 1 to 59% by weight of at least one flame retardant selected from the group of
  c1) the phosphorus-containing flame retardants
  c2) the nitrogen-containing flame retardants
  and mixtures of these,
D) from 0 to 50% by weight of further additives,
where the total of the proportions by weight is 100% by weight based on the molding composition.

The present invention further relates to the use of the thermoplastic molding composition as coating material and for producing fibers, foils or moldings, and also to fibers, foils or moldings comprising this thermoplastic molding composition.

Preferred embodiments can be found in the claims and in the description. Combinations of preferred embodiments are within the scope of the present invention.

The requirement for flame-retardant molding compositions is of increasing interest, and molding compositions of particular interest here are those having good processability in the melt. Molding compositions having good thermal stability are also of increasing importance.

By way of example EP 0 547 809 A1 discloses a flame-retardant polyester molding composition comprising halogenated flame retardants, silicate filler, neoalkoxy titanate compounds and polyetherimide esters.

EP 0921 161 A1 in turn discloses a flame-retardant molding composition comprising polyetherimides, aromatic polycarbonates and functionalized polysiloxanes.

The object of the invention consisted in providing a thermoplastic molding composition which has very good flame-retardant properties. The molding composition should moreover have good thermal stability. In particular, the polyamide of the molding composition should be stabilized to inhibit transesterification. Transesterification of the polyamide would lead inter alia to impaired mechanical properties.

However, the molding composition should be halogen-free, in particular bromine- and chlorine-free. The molding composition should also have high aromatic content, a result of which can be inter alia that the molding composition carbonizes rapidly during combustion and does not form drops on heating.

The intention here was in particular to provide molding compositions which comprise no halogen-containing flame retardants, and molding compositions of particular interest here are chlorine- and bromine-free. For phosphorus-containing flame retardants, there is a requirement for high phosphorus stability. Another intention was to provide molding compositions which are resistant to hydrolysis.

The thermoplastic molding composition is moreover intended to have good mechanical properties and good processability in the melt.

Accordingly, the thermoplastic molding composition defined in the introduction has been discovered.

"Halogen-free" in this context is to be interpreted in accordance with the definitions of the "International Electronical Commission" (IEC 61249-2-21) and "Japan Printed Circuit Association" (JPCA-ES-01-1999), where halogen-free materials are those which are very substantially chlorine- and bromine-free.

Component A) of the thermoplastic molding composition of the invention is a polyamide.

The polyamide here can be a homo- or copolymer. The invention can use, as polyamide, at least one linear or else predominantly branched polyamide. Linear polyamides are those which can be produced from dicarboxylic acids and diamines. A predominantly branched polyamide is on the other hand one which can be produced from amines and carboxylic acids where the monomers can comprise more than two acid groups and/or amine groups, and therefore branching points can arise.

The polyamide of the thermoplastic molding composition of the invention can generally have an intrinsic viscosity of from 30 to 350 ml/g, preferably from 40 to 200 ml/g, determined in 0.5% by weight solution in 96% by weight sulfuric acid at 25° C. to ISO 307.

Preference is given to semi-crystalline or amorphous resins with molecular weight (weight-average) of at least 5000, for example those described in U.S. Pat. Nos. 2,071,250, 2,071, 251, 2,130,523, 2,130,948, 2,241,322, 2,312,966, 2,512,606, and 3,393,210.

Examples of these polyamides which derive from lactams having from 7 to 13 ring members, e.g. polycaprolactam, polycaprylolactam and polylaurolactam, and also polyamides, obtained via reaction of dicarboxylic acids with diamines.

Dicarboxylic acids that can be used are alkanedicarboxylic acids having from 6 to 12, in particular from 6 to 10, carbon atoms, and aromatic dicarboxylic acids. Acids that may be mentioned here are adipic acid, azelaic acid, sebacic acid, dodecanedioic acid, and terephthalic and/or isophthalic acid, to mention just a few.

Particularly suitable diamines are alkanediamines having from 6 to 12, in particular from 6 to 8, carbon atoms, and also m-xylylenediamine, di(4-aminophenyl)methane, di(4-aminocyclohexyl)methane, 2,2-di(4-aminophenyl)propane, 2,2-di(4-aminocyclohexyl)propane, or 1,5-diamino-2-methylpentane.

Preferred polyamides are polyhexamethyleneadipamide, polyhexamethylenesebacamide, and polycaprolactam, and also nylon-6/6,6 copolyamides, in particular having from 5 to 95% by weight content of caprolactam units.

Other suitable polyamides are obtainable from w-aminoalkyl nitriles, such as, in particular, aminocapronitrile (PA 6) and adiponitrile with hexamethylenediamine (PA 66), by what is known as direct polymerization in the presence of water, as described by way of example in DE-A 10313681, EP-A 1198491, and EP 922065.

Mention may also be made of polyamides obtainable by way of example via condensation of 1,4-diaminobutane with adipic acid at an elevated temperature (nylon-4,6). Preparation processes for polyamides of said structure are described by way of example in EP-A 38 094, EP-A 38 582, and EP-A 39 524.

Other suitable polyamides are those obtainable via copolymerization of two or more of the abovementioned monomers, or a mixture of a plurality of polyamides, in any desired mixing ratio.

Semiaromatic copolyamides, such as PA 6/6T and PA 66/6T, have moreover proven particularly advantageous, especially those with a triamine content of less than 0.5% by weight, preferably less than 0.3% by weight (see EP-A 299 444).

The processes described in EP-A 129 195 and 129 196 can be used to produce the preferred semiaromatic copolyamides having low triamine content.

The preferred semiaromatic copolyamides A) comprise, as component $a_1$), from 40 to 90% by weight of units which derive from terephthalic acid and from hexamethylenediamine. A small proportion of the terephthalic acid, preferably not more than 10% by weight of the entire aromatic dicarboxylic acids used, can be replaced by isophthalic acid or by other aromatic dicarboxylic acids, preferably those in which the carboxy groups are in para-position.

The semiaromatic copolyamides comprise, alongside the units that derive from terephthalic acid and from hexamethylenediamine, units ($a_2$) which derive from ε-caprolactam and/or units ($a_3$) which derive from adipic acid and from hexamethylenediamine.

The proportion of units that derive from ε-caprolactam is at most 50% by weight, preferably from 20 to 50% by weight, and in particular from 25 to 40% by weight, while the proportion of units that derive from adipic acid and from hexamethylenediamine is up to 60% by weight, preferably from 30 to 60% by weight, and in particular from 35 to 55% by weight.

The copolyamides can also comprise not only units of ε-caprolactam but also units of adipic acid and of hexamethylenediamine; in this case, it is advantageous that the proportion of units free from aromatic groups is at least 10% by weight, preferably at least 20% by weight. There is no particular restriction here on the ratio of the units which derive from ε-caprolactam and from adipic acid and hexamethylenediamine.

Polyamides that have proven particularly advantageous for many applications are those having from 50 to 80% by weight, in particular from 60 to 75% by weight, of units which derive from terephthalic acid and hexamethylenediamine (units $a_1$)) and from 20 to 50% by weight, preferably from 25 to 40% by weight, of units which derive from ε-caprolactam (units $a_2$)).

The semiaromatic copolyamides can also comprise, alongside the units $a_1$) to $a_3$) described above, subordinate amounts, preferably no more than 15% by weight, in particular no more than 10% by weight, of further polyamide units ($a_4$) known from other polyamides. These units can derive from dicarboxylic acids having from 4 to 16 carbon atoms and from aliphatic or cycloaliphatic diamines having from 4 to 16 carbon atoms, or else from aminocarboxylic acids and, respectively, corresponding lactams having from 7 to 12 carbon atoms. Just a few examples of suitable monomers of these types may be mentioned: suberic acid, azelaic acid, sebacic acid, or isophthalic acid to represent the dicarboxylic acids, and 1,4-butanediamine, 1,5-pentanediamine, piperazine, 4,4'-diaminodicyclohexylmethane, 2,2-(4,4'-diaminodicyclohexyl)propane or 3,3'-dimethyl-4,4'-diaminodicyclohexylmethane to represent the diamines, and caprylolactam, enantholactam, omega-aminoundecanoic acid, and laurolactam to represent lactams and, respectively, aminocarboxylic acids.

The melting points of the semiaromatic copolyamides A) are in the range from 260 to above 300° C., and this high melting point also has an attendant high glass transition temperature which is generally above 75° C., in particular above 85° C.

Binary copolyamides based on terephthalic acid, hexamethylenediamine and ε-caprolactam, with contents of about 70% by weight of units which derive from terephthalic acid and hexamethylenediamine, have melting points in the region of 300° C. and glass transition temperature above 110° C.

Binary copolyamides based on terephthalic acid, adipic acid, and hexamethylenediamine (HMD) achieve melting points of 300° C. and more even at relatively low contents of about 55% by weight of units composed of terephthalic acid and hexamethylenediamine, but the glass transition temperature is not quite as high as for binary copolyamides which comprise ε-caprolactam instead of adipic acid or, respectively, adipic acid/HMD.

The following list, which is not comprehensive, comprises the polyamides A) mentioned and other polyamides A) for the purposes of the invention, and the monomers comprised.

AB Polymers:

| | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| PA 9T | Nonyldiamine/terephthalic acid |

AA/BB Polymers:

| | |
|---|---|
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | Nonyldiamine/terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

However, it is also possible to use a mixture of above polyamides.

Other monomers that can be used are cyclic diamines such as those of the general formula (I)

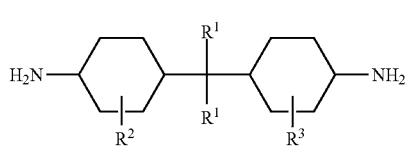

in which R1 is hydrogen or a C1-C4-alkyl group, R2 is a C1-C4-alkyl group or hydrogen and R3 is a C1-C4-alkyl group or hydrogen.

Particularly preferred diamines (I) are bis(4-aminocyclohexyl)methane, bis(4-amino-3-methylcyclohexyl)methane, bis(4-aminocyclohexyl)-2,2-propane, and bis(4-amino-3-methylcyclohexyl)-2,2-propane. 1,3- and 1,4-cyclohexanediamine and isophoronediamine are mentioned as other diamines (I).

Preference is given in particular here to mixtures made of amorphous polyamides with other amorphous polyamides or with semi-crystalline polyamides, where the semi-crystalline content can be from 0 to 50% by weight, preferably from 1 to 35% by weight based on 100% by weight of A).

Thermoplastic molding compositions of the invention also comprise at least one polyimide (B), which is branched and which is selected from condensates of either b1) at least one polyisocyanate having an average of more than two isocyanate groups per molecule or b2) at least one polyamine having an average of more than two amino groups per molecule and b3) at least one polycarboxylic acid having at least three COOH groups per molecule or its anhydride.

Polyimide (B) can have a molar mass $M_w$ in the range from 1000 to 200 000 g/mol, preferably at least 2000 g/mol.

Polyimide (B) can have at least two imide groups per molecule, preferably at least 3 imide groups per molecule.

In one embodiment of the present invention, polyimide (B) can have up to 1000 imide groups per molecule, preferably up to 660 per molecule.

In one embodiment of the present invention, the data for the number of isocyanate groups and, respectively, of COOH groups per molecule are always the average value (number average).

Polyimide (B) can be composed of molecules which are uniform in relation to structure and to molecular weight. However, it is preferable that polyimide (B) is a mixture of molecules which differ in relation to molecular weight and to structure, this being by way of example discernible from polydispersity $M_w/M_n$ of at least 1.4, preferably $M_w/M_n$ being from 1.4 to 50, preferably from 1.5 to 10. Polydispersity can be determined by known methods, in particular via gel permeation chromatography (GPC). An example of the suitable standard is polymethyl methacrylate (PMMA).

In one embodiment of the present invention, polyimide (B) also has, alongside imide groups which form the polymer skeleton, at least three, preferably at least six, more preferably at least ten, terminal or pendant functional groups. Functional groups in polyimide (B) are preferably anhydride groups or acid groups and/or free or capped NCO groups. Polyimides (B) preferably have no more than 500 terminal or pendant functional groups, preferably no more than 100.

Alkyl groups such as methyl groups do not therefore constitute branching of a polyimide (B) molecule.

Polyisocyanate (b1) can be selected from any desired polyisocyanates which have an average of more than two isocyanate groups per molecule, where these are present in capped form or preferably in free form. Preference is given to trimeric or oligomeric diisocyanates, for example oligomeric hexamethylene diisocyanate, oligomeric isophorone diisocyanate, oligomeric tolylene diisocyanate, oligomeric diphenylmethane diisocyanate—known as Polymer MDI—and mixtures of the above-mentioned polyisocyanates. By way of example, the compound known as trimeric hexamethylene diisocyanate often does not occur in the form of pure trimeric diisocyanate but instead occurs in the form of polyisocyanate having an average functionality of from 3.6 to 4 NCO groups per molecule. Analogous considerations apply to oligomeric tetramethylene diisocyanate and oligomeric isophorone diisocyanate.

In one embodiment of the present invention, polyisocyanate having more than two isocyanate groups per molecule is a mixture made of at least one diisocyanate and at least one triisocyanate, or one polyisocyanate having at least 4 isocyanate groups per molecule.

In one embodiment of the present invention, polyisocyanate (b1) has an average of 2.2 isocyanate groups per molecule, preferably 2.5, and particularly preferably, at least 3.0.

In one embodiment of the present invention, polyisocyanate (b1) is selected from oligomeric hexamethylene diisocyanate, oligomeric isophorone diisocyanate, oligomeric diphenylmethane diisocyanate, and mixtures of the above-mentioned polyisocyanates.

Polyisocyanate (b1) can also have, alongside urethane groups, one or more other functional groups, for example urea, allophanate, biuret, carbodiimide, amide, ester, ether, uretonimine, uretdione, isocyanurate or oxazolidine groups.

In a second variant, a polyamine (b2) and a polycarboxylic acid b3) and/or a polycarboxylic ester (b3) can be reacted with one another by analogy with the process described in the specification US 2010/009206.

The polyamine (b2) can be selected from any desired polyamines which have an average of more than two amine groups per molecule, where these can be present in capped form or preferably in free form.

Other compounds suitable as polyamine (b2) are those described in the specification US 2010/009206, for example 3,5-di(4-aminophenoxy)aniline, 3,5-di(3-methyl-1,4-aminophenoxy)aniline, 3,5-di(3-methoxy-4-aminophenoxy)aniline, 3,5-di(2-methyl-4-aminophenoxy)aniline, 3,5-di(2-methoxy-4-aminophenoxy)aniline, 3,5-di(3-ethyl-4-aminophenoxy)aniline, and comparable substances.

Other suitable amines are those such as 1,3,5-tri(4-aminophenoxy)benzene, 1,3,5-tri(3-methyl-1,4-aminophenoxy)benzene, 1,3,5-tri(3-methoxy-4-aminophenoxy)benzene, 1,3,5-tri(2-methyl-4-aminophenoxy)benzene, 1,3,5-tri(2-methoxy-4-aminophenoxy)benzene, 1,3,5-tri(3-ethyl-4-aminophenoxy)benzene.

Other aromatic triamines which can be used are 1,3,5-tri(4-aminophenylamino)benzene, 1,3,5-tri(3-methyl-4-aminophenylamino)benzene, 1,3,5-tri(3-methoxy-4-aminophenylamino)benzene, 1,3,5-tri(2-methyl-4-aminophenylamino)benzene, 1,3,5-tri(2-methoxy-4-aminophenylamino)benzene, 1,3,5-tri(3-ethyl-4-aminophenylamino)benzene, and the like.

Other aromatic triamines are 1,3,5-tri(4-aminophenyl)benzene, 1,3,5-tri(3-methyl-1,4-aminophenyl)benzene, 1,3,5-tri(3-methoxy-4-aminophenyl)benzene, 1,3,5-tri(2-methyl-4-aminophenyl)benzene, 1,3,5-tri(2-methoxy-4-aminophenyl)benzene, 1,3,5-tri(3-ethyl-4-aminophenyl)benzene, and similar compounds.

Other suitable compounds are 1,3,5-tri(4-aminophenyl)amine, 1,3,5-tri(3-methyl-1,4-aminophenyl)amine, 1,3,5-tri(3-methoxy-4-aminophenyl)amine, 1,3,5-tri(2-methyl-4-aminophenyl)amine, 1,3,5-tri(2-methoxy-4-aminophenyl)amine, 1,3,5-tri(3-ethyl-4-aminophenyl)amine, and similar compounds.

Other examples are tris(4-(4-aminophenoxy)phenyl)methane, tris(4-(3-methyl-4-aminophenoxy)phenyl)methane, tris(4-(3-methoxy-4-aminophenoxy)phenyl)methane, tris(4-(2-methyl-4-aminophenoxy)phenyl)methane, tris(4-(2-methoxy-4-aminophenoxy)phenyl)methane, tris(4-(3-ethyl-4-aminophenoxy)phenyl)methane, and comparable compounds.

Other suitable amines are tris(4-(4-aminophenoxy)phenyl)ethane, tris(4-(3-methyl-1,4'-aminophenoxy)phenyl)ethane, tris(4-(3-methoxy-4-aminophenoxy)phenyl)ethane, tris(4-(2-methyl-4-aminophenoxy)phenyl)ethane, tris(4-(2-methoxy-4-aminophenoxy)phenyl)ethane, tris(4-(3-ethyl-4-aminophenoxy)phenyl)ethane, and the like.

It is also possible to use polyamines mentioned in the specification US 2006 0 033 225 A1. By way of example, it is also possible to use 3,3',4,4'-biphenyltetramine (TAB), 1,2,4,5-benzenetetramine, 3,3',4,4'-tetraminodiphenyl ether, 3,3',4,4'-tetraminodiphenylmethane, 3,3',4,4'-tetraaminobenzophenone, 3,3',4-triaminodiphenyl, 3,3',4-triaminodiphenylmethane, 3,3',4-triaminobenzophenone, 1,2,4-triaminobenzene, and mono-, di-, tri-, or tetra-acid salts of these, like 2,4,6-triaminopyrimidine (TAP).

Polycarboxylic acids (b3) selected are aliphatic or preferably aromatic polycarboxylic acids which have at least three COOH groups per molecule, or the relevant anhydrides, preference being given to these in low-molecular-weight, i.e. non-polymeric, form. Such polycarboxylic acids having three COOH groups where two carboxylic acid groups are present in anhydride form and the third is present as free carboxylic acid are also comprised here.

In one preferred embodiment of the present invention polycarboxylic acid (b3) selected comprises a polycarboxylic acid having at least four COOH groups per molecule or the relevant anhydride.

Examples of polycarboxylic acids (b3) and anhydrides of these are 1,2,3-benzenetricarboxylic acid and 1,2,3-benzenetricarboxylic dianhydride, 1,3,5-benzenetricarboxylic acid (trimesic acid), preferably 1,2,4-benzenetricarboxylic acid (trimellitic acid), trimellitic anhydride and in particular 1,2,4,5-benzenetetracarboxylic acid (pyromellitic acid) and 1,2,4,5-benzenetetracarboxylic dianhydride (pyromellitic dianhydride), 3,3',4,4''-benzophenonetetracarboxylic acid, 3,3',4,4''-benzophenonetetracarboxylic dianhydride, and also benzenehexacarboxylic acid (mellitic acid), and anhydrides of mellitic acid.

Other suitable compounds are mellophanic acid and mellophanic anhydride, 1,2,3,4-benzenetetracarboxylic acid and 1,2,3,4-benzenetetracarboxylic dianhydride, 3,3,4,4-biphenyltetracarboxylic acid and 3,3,4,4-biphenyltetracarboxylic dianhydride, 2,2,3,3-biphenyltetracarboxylic acid and 2,2,3,3-biphenyltetracarboxylic dianhydride, 1,4,5,8-naphthalenetetracarboxylic acid and 1,4,5,8-naphthalenetetracarboxylic dianhydride, 1,2,4,5-naphthalenetetracarboxylic acid and 1,2,4,5-naphthalenetetracarboxylic dianhydride, 2,3,6,7-naphthalenetetracarboxylic acid and 2,3,6,7-naphthalenetetracarboxylic dianhydride, 1,4,5,8-decahydronaphthalenetetracarboxylic acid and 1,4,5,8-decahydronaphthalenetetracarboxylic dianhydride, 4,8-dimethyl-1,2,3,5,6,7-hexahydronaphthalene-1,2,5,6-tetracarboxylic acid and 4,8-dimethyl-1,2,3,5,6,7-hexahydronaphthalene-1,2,5,6-tetracarboxylic dianhydride, 2,6-dichloronaphthalene-1,4,5,8-tetracarboxylic acid and 2,6-dichloronaphthalene-1,4,5,8-tetracarboxylic dianhydride, 2,7-dichloronaphthalene-1,4,5,8-tetracarboxylic acid and 2,7-dichloronaphthalene-1,4,5,8-tetracarboxylic dianhydride, 2,3,6,7-tetrachloronaphthalene-1,4,5,8-tetracarboxylic acid and 2,3,6,7-tetrachloronaphthalene-1,4,5,8-tetracarboxylic dianhydride, 1,3,9,10-phenanthrenetetracarboxylic acid and 1,3,9,10-phenanthrenetetracarboxylic dianhydride, 3,4,9,10-perylenetetracarboxylic acid and 3,4,9,10-perylenetetracarboxylic dianhydride, bis(2,3-dicarboxyphenyl)methane and bis(2,3-dicarboxyphenyl)methane dianhydride, bis(3,4-dicarboxyphenyl)methane and bis(3,4-dicarboxyphenyl)methane dianhydride, 1,1-bis(2,3-dicarboxyphenyl)ethane and 1,1-bis(2,3-dicarboxyphenyl)ethane dianhydride, 1,1-bis(3,4-dicarboxyphenyl)ethane and 1,1-bis(3,4-dicarboxyphenyl)ethane dianhydride, 2,2-bis(2,3-dicarboxyphenyl)propane and 2,2-bis(2,3-dicarboxyphenyl)propane dianhydride, 2,3-bis(3,4-dicarboxyphenyl)propane and 2,3-bis(3,4-dicarboxyphenyl)propane dianhydride, bis(3,4-carboxyphenyl) sulfone and bis(3,4-carboxyphenyl) sulfone dianhydride, bis(3,4-carboxyphenyl)ether and bis(3,4-carboxyphenyl)ether dianhydride, ethylenetetracarboxylic acid and ethylenetetracarboxylic dianhydride, 1,2,3,4-butanetetracarboxylic acid and 1,2,3,4-butanetetracarboxylic dianhydride, 1,2,3,4-cyclopentanetetracarboxylic acid and 1,2,3,4-cyclopentanetetracarboxylic dianhydride, 2,3,4,5-pyrrolidinetetracarboxylic acid and 2,3,4,5-pyrrolidinetetracarboxylic dianhydride, 2,3,5,6-pyrazinetetracarboxylic acid and 2,3,5,6-pyrazinetetracarboxylic dianhydride, 2,3,4,5-thiophenetetracarboxylic acid and 2,3,4,5-thiophenetetracarboxylic dianhydride.

One embodiment of the present invention uses anhydrides from U.S. Pat. No. 2,155,687 or U.S. Pat. No. 3,277,117 to synthesize polyimide (B).

Production of component (B) can follow the mechanism shown in the formula below.

When a polyisocyanate (b1) and a polycarboxylic acid (b3) are reacted with one another, preferably in the presence of a catalyst, an imide group is formed with elimination of $CO_2$ and $H_2O$. When a polyisocyanate (b1) and a corresponding anhydride (b3) are reacted with one another, an imide group is formed with elimination of $CO_2$.

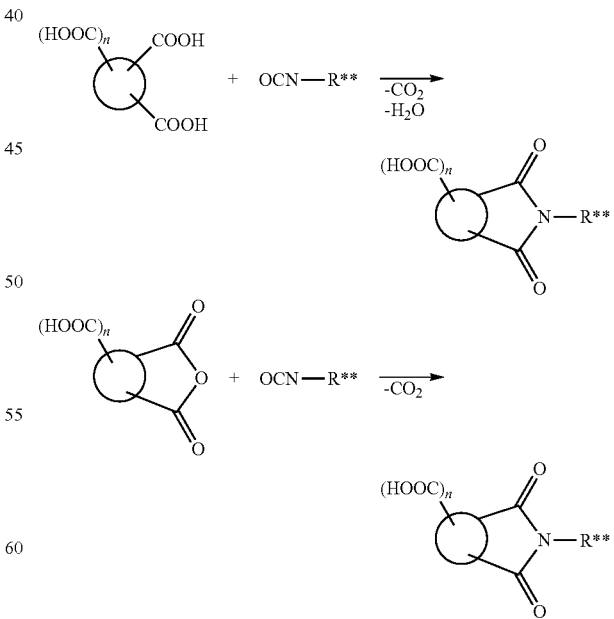

In the above formula R** is a polyisocyanate (b2) radical which is not specified in any more detail in the formula, and n is a number greater than or equal to 1. If, for example, n is 1, the compound is a tricarboxylic acid. If n is 2, it is a tetracarboxylic acid. (HOOC)$_n$ can be replaced by a C(=O)—O—C(=O) radical or by an ester.

When a polyamine (b2) and the polycarboxylic acid (b3) or the corresponding anhydride (b3) are reacted, preferably in the presence of a catalyst, an imide bond is formed with elimination of water.

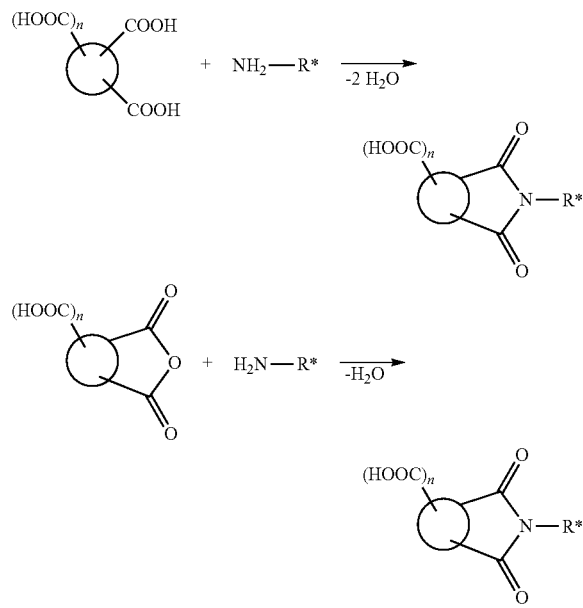

In the above formula R* is a polyamine (b2) radical which is not specified in any more detail in the formula. n is a number greater than or equal to 1. In the case of a tricarboxylic acid n is 1. In the case of a tetracarboxylic acid n is 2. (HOOC)$_n$ can be replaced by a C(=O)—O—C(=O) radical or by an ester.

Component B) can by way of example be produced via the process described below.

Polyisocyanate (b1) and polycarboxylic acid (b3) are condensed with one another—preferably in the presence of a catalyst—thus forming an imide group with elimination of CO$_2$ and H$_2$O. If the corresponding anhydride is used instead of polycarboxylic acid (b3), an imide group is formed with elimination of CO$_2$.

Suitable catalysts are in particular water and Brønsted bases, for example alkali metal alcoholates, in particular alkanolates of sodium or potassium, for example sodium methanolate, sodium ethanolate, sodium phenolate, potassium methanolate, potassium ethanolate, potassium phenolate, lithium methanolate, lithium ethanolate and lithium phenolate.

The amount of the catalyst used can be in the range from 0.005 to 0.1% by weight of catalyst, based on the entirety of polyisocyanate (b1) and polycarboxylic acid (b3) or polyisocyanate (b1) and anhydride (b3). Preference is given to an amount of from 0.01 to 0.05% by weight of catalyst.

The polyisocyanate (b1) can be used in a mixture with at least one diisocyanate, for example with tolylene diisocyanate or hexamethylene diisocyanate, or with isophorone diisocyanate. In one particular variant, polyisocyanate (b1) is used in a mixture with the corresponding diisocyanate, an example being trimeric HDI with hexamethylene diisocyanate or trimeric isophorone diisocyanate with isophorone diisocyanate or polymeric diphenylmethane diisocyanate (polymer MDI) with diphenylmethane diisocyanate.

The polycarboxylic acid (b3) can be used in a mixture with at least one dicarboxylic acid or with at least one dicarboxylic anhydride, for example with phthalic acid or phthalic anhydride.

One embodiment of the present invention uses a hyperbranched polyimide as polyimide (B). In the context of the present invention, "hyperbranched" means that the degree of branching (DB), i.e. the average number of dendritic linkages plus the average number of terminal groups per molecule, divided by the sum of the average number of dendritic, linear and terminal linkages and multiplied by 100, is from 10 to 99.9%, preferably from 20 to 99%, particularly preferably from 20 to 95%. In the context of the present invention, "dendrimer" means that the degree of branching is from 99.9 to 100%. For the definition of "degree of branching" see H. Frey et al., Acta Polym. 1997, 48, 30, and see Sunder et al., Chem. Eur. J. 2000, 6 (14), 2499-2506. The degree of branching can be calculated with the aid of "inverse-gated" $^{13}$NMR spectra.

Component B) can be produced by using polyisocyanate (b1) and polycarboxylic acid (b3) or anhydride (b3) in a quantitative proportion in which the molar ratio of NCO groups to COOH groups is in the range from 1:3 to 3:1, preferably from 1:2 to 2:1. An anhydride group of the formula CO—O—CO counts as two COOH groups.

Component B) is typically produced at temperatures in the range from 50 to 200° C., preferably from 50 to 140° C., particularly preferably from 50 to 100° C.

The compounds B) can be produced in the presence of a solvent or solvent mixture. Examples of suitable solvents are N-methylpyrrolidone, N-ethylpyrrolidone, dimethylformamide, dimethylacetamide, dimethylsulfoxide, dimethyl sulfone, xylene, phenol, cresol, and ketones such as acetone, methyl ethyl ketone (MEK), methyl isobutyl ketone (MIBK), acetophenone and also mono- and dichlorobenzene, ethylene glycol monoethyl ether acetate, and mixtures of two or more of the above-mentioned solvents. The solvent(s) here can be present during the entire synthesis time or during only a portion of the synthesis.

Component B) can moreover be produced under inert gas, for example under argon or under nitrogen. Particularly if a water-sensitive Brønsted base is used as catalyst, it is preferable to dry the inert gas and solvent. If water is used as catalyst, the drying of solvent and inert gas can be omitted.

Component B) can also be produced via reaction of b2) with b3), by analogy with the reaction of b1) with b3) and under the same conditions.

Component B) can also be produced via reaction of b2) with b3), as described in the specification US 2006 0 033 225 A1.

In one variant of component (B), the terminal NCO groups of the polyimide (B) have been capped by a compound reactive toward NCO groups. By way of example, a secondary amine (b4) can be used here.

Compounds of the type NHR'R" can be used as secondary amine (b4), where R' and R" can be aliphatic and/or aromatic radicals. The aliphatic radicals can be linear, cyclic, and/or branched. R' and R" can be identical. However, neither R' nor R" is a hydrogen atom.

An example of a compound suitable as amine (b4) is dimethylamine, di-n-butylamine or diethylamine or a mixture of these. Other suitable compounds are dihexylamine, di-(2-ethylhexyl)amine, and dicyclohexylamine. Preference is given to diethylamine and dibutylamine.

Component (B) can also be capped by an alcohol (b5). Compounds suitable here are primary alcohols or a mixture of these. Particularly suitable compounds from the group of the primary alcohols are methanol, ethanol, isopropanol, n-propanol, n-butanol, and isobutanol. Preference is given to methanol and isobutanol.

In one embodiment of the present invention, thermoplastic molding composition of the invention can also comprise (C) at least one flame retardant.

Suitable compounds from the group of the phosphorus-containing flame retardants c1) are phosphinic salts of the formula (I) or/and diphosphinic salts of the formula (II) or polymers thereof.

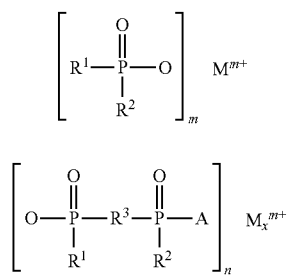

in which $R^1, R^2$ are identical or different and are $C_1$-$C_6$-alkyl, linear or branched and/or aryl;

$R^3$ is $C_1$-$C_{10}$-alkylene, linear or branched, $C_6$-$C_{10}$-arylene, or -alkylarylene or -arylalkylene;

M is Mg, Ca, Al, Sb, Sn, Ge, Ti, Zn, Fe, Zr, Ce, Bi, Sr, Mn, Li, Na, K, and/or a protonated nitrogen base;

M is from 1 to 4; n is from 1 to 4; x is from 1 to 4.

$R^1$, $R^2$ of component B, being identical or different, are preferably methyl, ethyl, n-propyl, isopropyl, n-butyl, tert-butyl, n-pentyl and/or phenyl.

$R^3$ of component B is preferably methylene, ethylene, n-propylene, isopropylene, n-butylene, tert-butylene, n-pentylene, n-octylene or n-dodecylene, phenylene or naphthylene; or methylphenylene, ethylphenylene, tert-butylphenylene, methylnaphthylene, ethylnaphthylene or tert-butylnaphthylene; or phenylmethylene, phenylethylene, phenylpropylene or phenylbutylene.

It is particularly preferable that $R^1$, $R^2$ are methyl or ethyl and that M=Al.

Phosphorus is also suitable, and in particular it is possible to use red or black phosphorus or a mixture of these.

The invention can use a nitrogen-containing flame retardant as component c2). Melamine cyanurate is preferably suitable, and is a reaction product of preferably equimolar amounts of melamine (formula III) and cyanuric acid or isocyanuric acid (formulae III a and III b).

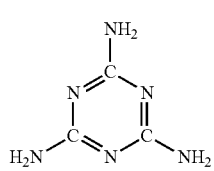

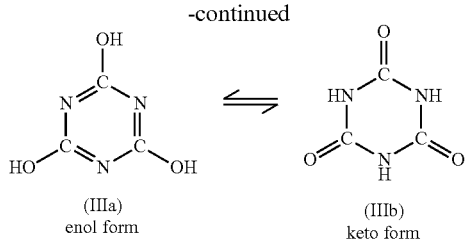

Melamine cyanurate is obtained by way of example via reaction of aqueous solutions of the starting compounds at from 90 to 100° C. The commercially available product is a white powder with average grain size $d_{50}$ from 1.5 to 7 µm.

Other suitable compounds (also often termed salts or adducts) are melamine, melamine borate, melamine oxalate, melamine phosphate (prim.), melamine phosphate (sec.) and melamine pyrophosphate (sec.), melamine neopentyl glycol borate and polymeric melamine phosphate (CAS No. 56386-64-2).

Preference is given to melamine polyphosphate salts derived from a 1,3,5-triazine compound, of which the number n representing the average degree of condensation is from 20 to 200, and the 1,3,5-triazine content, per mole of phosphorus atom, is from 1.1 to 2.0 mol of a 1,3,5-triazine compound, selected from the group consisting of melamine, melam, melem, melon, ammeline, ammelide, 2-ureidomelamine, acetoguanamine, benzoguanamine and diaminophenyltriazine. It is preferable that the n-value of these salts is generally from 40 to 150 and that the molar ratio of a 1,3,5-triazine compound to phosphorus atom is from 1.2 to 1.8. The pH of a 10% by weight aqueous slurry of salts produced as in EP1095030B1 is moreover generally more than 4.5 and preferably at least 5.0. The pH is usually determined by placing 25 g of the salt and 225 g of pure water at 25° C. in a 300-ml beaker, stirring the resultant aqueous slurry for 30 minutes, and then measuring the pH. The above-mentioned n-value, the number-average degree of condensation, can be determined by means of 31P solid-phase NMR. J. R. van Wazer, C. F. Callis, J. Shoolery and R. Jones, J. Am. Chem. Soc., 78, 5715, 1956, discloses that the number of adjacent phosphate groups is given by a unique chemical shift which permits clear distinction between orthophosphates, pyrophosphates and polyphosphates. EP1095030B1 moreover describes a process for producing the desired polyphosphate salt of a 1,3,5-triazine compound which has an n-value of from 20 to 200, where the 1,3,5-triazine content of said salt is from 1.1 to 2.0 mol of a 1,3,5-triazine compound. Said process comprises the conversion of a 1,3,5-triazine compound into its orthophosphate salt by orthophosphoric acid, followed by dehydration and heat treatment in order to convert the orthophosphate salt into a polyphosphate of the 1,3,5-triazine compound. Said heat treatment is preferably carried out at a temperature of at least 300° C., and preferably at at least 310° C. In addition to orthophosphates of 1,3,5-triazine compounds, it is equally possible to use other 1,3,5-triazine phosphates, inclusive of, for example, a mixture made of orthophosphates and of pyrophosphates.

Suitable guanidine salts are

|  | CAS No. |
|---|---|
| G carbonate | 593-85-1 |
| G cyanurate prim. | 70285-19-7 |
| G phosphate prim. | 5423-22-3 |

| | CAS No. |
|---|---|
| G phosphate sec. | 5423-23-4 |
| G sulfate prim. | 646-34-4 |
| G sulfate sec. | 594-14-9 |
| Guanidine pentaerythritol borate | N.A. |
| Guanidine neopentyl glycol borate | N.A. |
| and also urea phosphate green | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

For the purposes of the present invention the compounds include, for example, benzoguanamine itself and its adducts or salts, and also the derivatives substituted on nitrogen and their adducts or salts.

Another suitable compound is ammonium polyphosphate $(NH_4PO_3)_n$, where n is from about 200 to 1000, preferably from 600 to 800, and tris(hydroxyethyl) isocyanurate (THEIC) of the formula IV

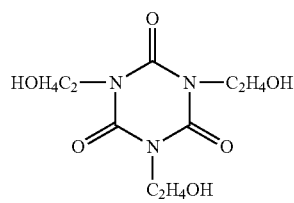

IV or its reaction products with aromatic carboxylic acids $Ar(COOH)_m$, optionally in mixtures with one another, where Ar is a mono-, bi- or trinuclear aromatic si-membered ring system and m is 2, 3 or 4.

Examples of suitable carboxylic acids are phthalic acid, isophthalic acid, terephthalic acid, benzene-1,3,5-tricarboxylic acid, benzene-1,2,4-tricarboxylic acid, pyromellitic acid, mellophanic acid, prehnitic acid, 1-naphthoic acid, 2-naphthoic acid, naphthalenedicarboxylic acids, and anthracenecarboxylic acids.

They are prepared by reacting the tris(hydroxyethyl)isocyanurate with the acids, or with their alkyl esters or their halides in accordance with the process of EP-A 584 567.

Reaction products of this type are a mixture of monomeric and oligomeric esters which may also have crosslinking. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC, is preferably 90-50:10-50% by weight, in particular 80-50:50-20% by weight, based on the mixture of components B1) of this type.

Other suitable compounds are benzoguanamine compounds of the formula V

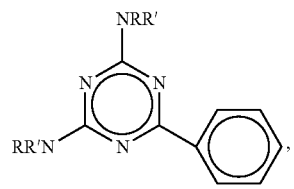

(V)

where R and R' are straight-chain or branched alkyl radicals having from 1 to 10 carbon atoms, preferably hydrogen and in particular their adducts with phosphoric acid, boric acid and/or pyrophosphoric acid.

Preference is also given to allantoin compounds of the formula VI

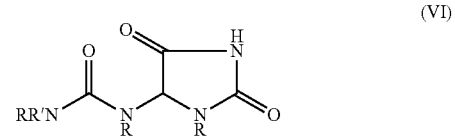

(VI)

where R and R' are as defined in formula V, and also to the salts of these with phosphoric acid, boric acid and/or pyrophosphoric acid, and also to glycolurils of the formula VII and to their salts with the abovementioned acids

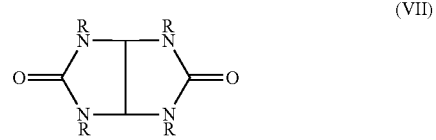

(VII)

where R is as defined in formula V.

Suitable products are obtainable commercially or in accordance with DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

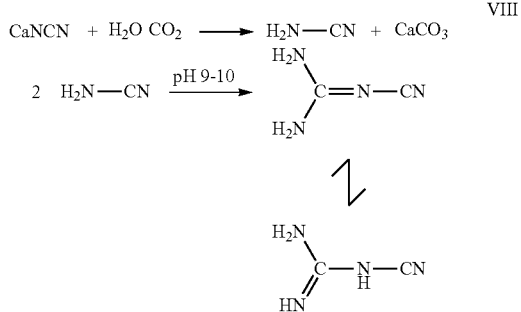

VIII

The product obtainable commercially is a white powder with a melting point of from 209° C. to 211° C.

The thermoplastic molding compositions of the invention can comprise, as component D), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, etc.

The following are mentioned as examples of oxidation retarders and heat stabilizers: sterically hindered phenols and/or phosphites and amines (e.g. TAD), hydroquinones, aromatic secondary amines such as diphenylamines, various substituted representatives of these groups, and mixtures of these in concentrations of up to 1% by weight, based on the weight of the thermoplastic molding compositions.

The following UV stabilizers are mentioned, the amounts used of these generally being up to 2% by weight, based on the thermoplastic molding composition: various substituted resorcinols, salicylates, benzotriazoles and benzophenones.

Colorants that can be used are inorganic pigments, such as carbon black, and also organic pigments, such as phthalocyanines, quinacridones, perylenes and also dyes, such as anthraquinones.

Nucleating agents that can be used are sodium phenylphosphinate, aluminum oxide, and silicon dioxide.

Glass particles inclusive of glass fibers with various dimensions can moreover be used.

In one embodiment of the present invention, the thermoplastic molding composition of the invention comprises from 20 to 98.99% by weight of polyamide (A), preferably from 25 to 98% by weight, particularly preferably from 30 to 88% by weight, from 0.01 to 40% by weight of polyimide (B), preferably from 1 to 35% by weight, particularly preferably from 5 to 30% by weight, from 1 to 59% by weight of flame retardant (C), preferably from 1 to 40% by weight, particularly preferably from 2 to 20% by weight, from 0-50% by weight of other additives (D), preferably from 0 to 30% by weight, particularly preferably from 0.1 to 30% by weight, where the total of the proportions by weight is 100% by weight based on the thermoplastic molding composition.

The tables below give some examples of suitable molding compositions of the invention.

TABLE 1.1

Molding compositions comprising phosphinates as flame retardant c1) (where D is composed predominantly [i.e. to an extent of more than 50% by weight based on component D] of glass fiber).

| Molding composition | A | B | C | D |
| --- | --- | --- | --- | --- |
| 1 | 70 | 10 | 20 | 0 |
| 2 | 60 | 20 | 20 | 0 |
| 3 | 50 | 30 | 20 | 0 |
| 4 | 80 | 10 | 10 | 0 |
| 5 | 70 | 20 | 10 | 0 |
| 6 | 60 | 30 | 10 | 0 |
| 7 | 45 | 10 | 20 | 25 |
| 8 | 65 | 20 | 20 | 25 |
| 9 | 25 | 30 | 20 | 25 |
| 10 | 55 | 10 | 10 | 25 |
| 11 | 45 | 20 | 10 | 25 |
| 12 | 35 | 30 | 10 | 25 |

TABLE 1.2

Molding compositions comprising phosphinates as flame retardant c1) (where D is composed predominantly [i.e. to an extent of more than 50% by weight based on component D] of glass fiber).

| | MC13 in % by wt. | MC14 in % by wt. | MC15 in % by wt. |
| --- | --- | --- | --- |
| A: nylon-6 | 20-98.99 | 25-98 | 30-88 |
| B: polyimide, $M_w$ 2800 g/mol, $M_n$ 1100 g/mol | 0.01-40 | 1-35 | 5-30 |
| C: DEPAL/MPP from 1.5/1 to 3/1 | 1-59 | 1-40 | 2-20 |
| D: glass fibers | 0-50 | 0-30 | 0.1-30 |

| | MC16 in % by weight | MC17 in % by weight | MC18 in % by weight |
| --- | --- | --- | --- |
| A: nylon-6,6 | 20-98.99 | 25-98 | 30-88 |
| B: polyimide, $M_w$ 2800 g/mol, $M_n$ 1100 g/mol | 0.01-40 | 1-35 | 5-30 |
| C: DEPAL/MPP from 1.5/1 to 3/1 | 1-59 | 1-40 | 2-20 |
| D: glass fibers | 0-50 | 0-30 | 0.1-30 |

TABLE 2.1

Molding compositions comprising red phosphorus as flame retardant c1) (where D is composed predominantly [i.e. to an extent of more than 50% by weight based on component D] of glass fiber).

| Molding composition | A | B | C | D |
| --- | --- | --- | --- | --- |
| 19 | 70 | 10 | 7.5 | 0 |
| 20 | 60 | 20 | 7.5 | 0 |
| 21 | 50 | 30 | 7.5 | 0 |
| 22 | 80 | 10 | 15 | 0 |
| 23 | 70 | 20 | 15 | 0 |
| 24 | 60 | 30 | 15 | 0 |
| 25 | 45 | 10 | 7.5 | 25 |
| 26 | 65 | 20 | 7.5 | 25 |
| 27 | 65 | 30 | 7.5 | 25 |
| 28 | 65 | 10 | 15 | 25 |
| 29 | 25 | 20 | 15 | 25 |
| 30 | 55 | 30 | 15 | 25 |

TABLE 2.2

Molding compositions comprising red phosphorus as flame retardant c1) (where D is composed predominantly [i.e. to an extent of more than 50% by weight based on component D] of glass fiber).

| | MC31 in % by wt. | MC32 in % by wt. | MC33 in % by wt. |
| --- | --- | --- | --- |
| A: nylon-6 | 20-98.99 | 25-98 | 30-88 |
| B: polyimide, $M_w$ 2800 g/mol, $M_n$ 1100 g/mol | 0.01-40 | 1-35 | 5-30 |
| C: red phosphorus | 1-59 | 1-40 | 2-20 |
| D: glass fibers and impact modifier | 0-50 | 0-30 | 0.1-30 |

| | MC34 in % by wt. | MC35 in % by wt. | MC36 in % by weight |
| --- | --- | --- | --- |
| A: nylon-6,6 | 20-98.99 | 25-98 | 30-88 |
| B: polyimide, $M_w$ 2800 g/mol, $M_n$ 1100 g/mol | 0.01-40 | 1-35 | 5-30 |

TABLE 2.2-continued

Molding compositions comprising red phosphorus as flame retardant c1) (where D is composed predominantly [i.e. to an extent of more than 50% by weight based on component D] of glass fiber).

| | | | |
|---|---|---|---|
| C: red phosphorus | 1-59 | 1-40 | 2-20 |
| D: glass fibers and impact modifier | 0-50 | 0-30 | 0.1-30 |

The thermoplastic molding composition of the invention can be produced by the known processes. To this end, starting components are by way of example mixed in conventional mixing apparatuses, such as screw-based extruders, Brabender mixers, or Banbury mixers, and are then extruded. The extrudate can be cooled and comminuted. It is also possible to premix individual components and then to add the remaining starting materials individually and/or likewise in a mixture. The mixing temperatures are generally in ranges from 240° C. to 265° C. The temperature is based on the temperature of the extruder.

The thermoplastic molding composition of the invention exhibits flame-retardant effect. In order to demonstrate the flame-retardant properties, moldings were produced and surprisingly, in the light of good processability, passed the UL 94 fire test in Class V-0 or V-1.

The thermoplastic molding composition of the invention is therefore suitable for industrial production of flame-retardant materials.

The mechanical properties of the thermoplastic molding composition of the invention favor the use of the thermoplastic molding composition to produce fibers, foils and/or moldings. In particular, the thermoplastic composition is suitable for producing specific moldings in vehicles and construction of equipment, for example, for industrial purposes or for consumer-related purposes. The thermoplastic molding composition can therefore be used for producing electronic components, housings, housing parts, protective cover flaps, bumpers, spoilers, bodywork parts, damping elements, springs, grips, charge-air pipes, or vehicle-interior applications, such as instrument panels, parts of instrument panels, instrument panel supports, protective covers, air ducts, air inlet grilles, sunroof rails, roof frames, add-on parts, in particular the center console, or as part of the glove compartment, or else protective covers for tachometers.

The thermoplastic molding composition of the invention can be used as coating material for fibers, foils and/or moldings. Moldings are three-dimensional articles which can be coated with a thermoplastic composition. The thickness of these coatings is generally in ranges from 0.1 to 3.0 cm, preferably from 0.1 to 2.0 cm, very particularly preferably from 0.5 to 2.0 cm. Coatings of this type can be produced by processes known to the person skilled in the art, e.g. lamination, painting, dip-coating, or spraying, or other application methods.

Examples are used to illustrate the application

EXAMPLES

ISO Standards and Methods

DIN ISO 307: Plastics—Polyamides—determination of viscosity number (2007).
DIN EN ISO 11 909: Binders for paints and varnishes—isocyanate resins—General methods of test (ISO 11909:2007); German version EN ISO 11909:2007.
ISO 4589-2: Plastics—Determination of burning behavior by oxygen index—Part 2: Ambient-temperature test (ISO 4589-2:1996+Amd. 1:2005) German version EN ISO 4589-2:1999+A1:2006.
UL 94 Flame Test The molecular weights of the polyisocyanates were determined by gel permeation chromatography (GPC using a refractometer as detector). Polymethyl methacrylate (PMMA) was used as standard. Tetrahydrofuran (THF) was used as solvent, unless expressly otherwise stated.

NCO content was determined titrimetrically to DIN EN ISO 11 909 and has been stated in % by weight.

General Remarks

Component A)

Polyamide A.1: nylon-6,6 with intrinsic viscosity IV 150 ml/g, measured on a 0.5% by weight solution in 96% by weight sulfuric acid at 25° C. to ISO 307. (Ultramid® A27 from BASF SE was used).

Polyamide A.2: nylon-6 with intrinsic viscosity IV 145 ml/g, measured on a 0.5% by weight solution in 96% by weight sulfuric acid at 25° C. to ISO 307. (Ultramid® B27 from BASF SE was used).

Component B)

Synthesis Examples

Materials

Polyisocyanate (b1.1): polymeric diphenylmethane 4,4'-diisocyanate ("polymer MDI"), 2.7 isocyanate groups per molecule, viscosity: 195 mPa·s at 25° C., available commercially as Lupranat® M20 W
Polyisocyanate (b1.2): isocyanurate of hexamethylene diisocyanate, average of 3.6 isocyanate groups per molecule, available commercially as Basonat® HI from BASF SE.
Anhydride (b3.1): 1,2,4,5-benzenetetracarboxylic dianhydride
Secondary amine (b4.1): n-dibutylamine
Primary alcohol (b5.1): methanol
Primary alcohol (b5.2): t-butanol The syntheses were carried out under nitrogen unless otherwise described. When sodium methanolate was used as catalyst, dry nitrogen was selected.

1) Polyimide B.1

100 g of anhydride (b3.1) (0.46 mol) dissolved in 1400 ml of acetone were used as initial charge and 0.1 g of water was admixed. 308 g (0.46 mol) of polyisocyanate (b 1.2) were then added at 20° C. The mixture was heated to 55° C. After 12 more hours, an excess of methanol (b5.1) was added and stirring was continued for two more hours. The acetone-methanol mixture was then removed by distillation. Toward the end of the distillation process, the residue was stripped with nitrogen This gave polyimide (BA) with the following analytical data: $M_w$=2100 g/mol, (solution THF), $M_n$=600 g/mol, acid number=41 mg KOH/g.

2) Polyimide B.2

100 g of anhydride (b3.1) (0.46 mol) dissolved in 1400 ml of acetone were used as initial charge and 0.1 g of water was admixed. 150 g (0.224 mol) of polyisocyanate (b 1.2) were then added at 20° C. The mixture was heated to 55° C. and kept at said temperature. After 8 more hours, 140 g of n-dibutylamine (b4.1) were added with stirring and stirring of the mixture was continued for two more hours. Acetone was then removed by distillation. Toward the end of the distillation process, the residue was stripped with nitrogen This gave polyimide (B.2) with the following analytical data: $M_w$=3800 g/mol, (solution THF), $M_n$=500 g/mol, acid number=62 mg KOH/g.

3) Polyimide B.3

480 g of anhydride (b3.1) (2.20 mol), dissolved in 1400 ml of N-methylpyrrolidone, were used as initial charge and 0.1 g of water was admixed. The mixture was heated to 80° C. 370 g (1.10 mol) of polyisocyanate (b 1.1) were added at 80° C. The mixture was stirred at 80° C. for 3 hours. An excess of tert-butanol (b5.2) was then added at 50° C. Stirring of the mixture was continued for one more hour. The mixture was cooled and, at room temperature, added to water. The resultant powder was dried at 140° C. under nitrogen. This gave polyimide (B.3) with the following analytical data: $M_w$=2800 g/mol, (solvent THF), $M_n$=1100 g/mol.

Component C

C1) Mixture made of 50% by weight of particulate red phosphorus in 50% by weight of nylon-6,6 with a molecular weight $M_w$ about 75 000 Daltons.
C2) Mixture made of 64% of aluminum diethylphosphinate (DEPAL), 31% by weight of melamine polyphosphate (MPP), and zinc borate (5% by weight).

Component D)

D1) Standard chopped glass fiber for polyamides, length=4.5 mm, diameter=10 µm.
D2) Ethylene copolymer made of 59.8% by weight of ethylene, 4.5% by weight of acrylic acid, 35% by weight of n-butyl acrylate and 0.7% by weight of maleic anhydride.
D3a) Stearyl stearate.
D3b) Zinc stearate.
D3c) Ca stearate.

Production of Thermoplastic Molding Compositions

The thermoplastic molding compositions were produced by using batchwise extrusion to process 20 g of components A) to D) at from 260 to 280° C. The residence time of the thermoplastic molding composition in the extruder was from 3 min to 5 min.

The melt was then shaped with the aid of the injection molding unit to give UL 94 and LOI test specimens.

Phosphorus stability test on molding compositions comprising red phosphorus.

Red phosphorus disproportionates in the presence of water and oxygen, forming water-soluble phosphorus compounds. To measure the stability of the phosphorus, the test specimens (standard small specimens) measuring 50×6×4 mm of the molding composition comprising phosphorus were stored at 60° C. in water, and the phosphorus content of the aqueous solution was determined by ICP-OES after an appropriate storage time.

Standard small specimens weighing about 80 g were weighed into a 300 mL PE beaker, and covered with 150 g of deionized water. The water level was then marked on the beaker, which was sealed and heated to 60° C. Further water was regularly added to replace the amount evaporated. The phosphorus content in the solution was measured by cooling the specimen to room temperature after a storage time of 14/30/50/100 days, bringing the amount of water precisely to 150 g by adding deionized water, and removing 10 mL for analysis after brief swirling. Water is then added to replace the amount removed, and the specimen is appropriately stored again until the 100 days have expired. The phosphorus content within the aqueous solution is determined by way of ICP-OES (inductively coupled plasma—optical emission spectroscopy), and this includes all of the phosphorus compounds present in the water. The phosphorus stability was documented in mg/L of P as a function of storage time.

Brief Description of Flame Tests:

Limiting Oxygen Index (LOI)

The LOI test is executed in accordance with the standard ISO 4589-2. The oxygen index is a measure of the combustibility of plastics, because it states the minimum amount of oxygen that has to be present in the ambient atmosphere for the specimen studied to burn. A plastic with high LOI accordingly has low combustibility, while a low LOI indicates high combustibility. Plastics having an LOI above 23 are classified as of low combustibility since combustion of these requires more oxygen than is present in air. The test is carried out in a glass tube of height from 450 to 500 mm and width from 75 to 100 mm. The test specimens used comprise halved fire specimens (L/W: 125 mm/6.5 mm) of thickness 1.6 mm. A gas stream made of nitrogen and oxygen is introduced at the bottom of the tube, while at the upper end a small flame is applied to the test specimen. The aim here is to find the minimum concentration of oxygen at which the test specimen burns for at least three minutes without interruption or burns as far as the lowest point. (Fire Retardancy of polymeric materials; edited by Charles A. Wilkie and Alexander B. Morgan—2nd edition—Taylor and Francis Group, LLC 2010; pp. 356 ff.)

UL 94 Test

The test described here is the UL 94 test with vertical specimen arrangement. The dimensions of the test specimens used are 125 mm×13 mm and they are produced by injection molding at three different thicknesses (0.4 mm, 0.8 mm, and 1.6 mm). Prior to the test, these are either stored under standard conditions of temperature and humidity at 23° C./50% rel. humidity for 48 hours, or are stored at 70° C. in a desiccator for 168 hours with subsequent cooling.

The test uses test series, each involving 5 test specimens. The test specimen is clamped into a suspension apparatus arranged in a draft-free test chamber. 300 mm below the lower edge of the test specimen there is a horizontal cotton indicator of dimensions 50 mm×50 mm×6 mm. A non-luminous Bunsen burner flame of height 20 mm is applied to the test specimen. The flame is applied for two periods of 10 s, and the second application of the flame here begins as soon as extinguishment of the ignited specimen has occurred. (Werkstoff-Fuhrer Kunststoffe [Materials guide: Plastics]; ed. by Walter Hellerrich, Günther Harsch and Siegfried Haenle—9th edition—Hanser Verlag Munich, Vienna, 2004; pp. 259 ff.)

Classification of UL 94 Test Results:

| Class | |
|---|---|
| Class 94 V-0 | Afterflame time after end of flame application never more than 10 s; sum of afterflame times for 10 flame applications (5 specimens) not greater than 50 s; no flaming drops or ignition of cotton indicator; no specimen completely consumed by combustion; afterglow time of the specimens after end of flame application never more than 30 s |
| Class 94 V-1 | Afterflame time after end of flame application never more than 30 s; sum of afterflame times for 10 flame applications (5 specimens) not greater than 250 s; no flaming drops or ignition of cotton indicator; no specimen completely consumed by combustion; afterglow time of the specimens after end of flame application never more than 60 s |
| Class 94 V-2 | Ignition of the indicator by flaming drops; afterflame time after end of flame application never more than 30 s; sum of afterflame times for 10 flame applications (5 specimens) not greater than 250 s; no specimen completely consumed by combustion; afterglow time of the specimens after end of flame application never more than 60 s |
| Class 94 V-- | No compliance with the abovementioned criteria |

Flame Test

The UL 94 flame test was carried out in accordance with the standard on specimens of thickness 1.6 cm.

TABLE 3

Flame test results: molding compositions with red phosphorus.

|  | Inv. example 1 | Comp. example 1.1 |
|---|---|---|
| Component A | 45.33% of PA-66 | 65.33% of PA-66 |
| Component B | 20% of polyimide B.2 | — |
| Component c1 | 3.25% | 3.25% |
| Component c2 | — | — |
| Component D1 | 25% of glass fibers | 25% of glass fibers |
| Component D2 | 6% of ethylene copolymer | 6% of ethylene copolymer |
| Component D3a | 0.07 | 0.07 |
| Component D3c | 0.35 | 0.35 |
| UL 94 Flame test | V-0 | V-1 |

TABLE 4

Flame test results: molding compositions with phosphorus-containing compounds (Exolit OP 1312).

|  | Inv. example 2 | Inv. example 3 | Comp. example 2.2 |
|---|---|---|---|
| Component A | 44.65% of PA-66 | 44.65% of PA-66 | 64.65% of PA-66 |
| Component B | 20% of polyimide B.2 | 20% of polyimide B.1 | — |
| Component c1 | — | — | — |
| Component c2 | 10% | 10% | 10% |
| Component D1 | 25% of glass fibers | 25% of glass fibers | 25% of glass fibers |
| Component D3b | 0.35 | 0.35 | 0.35 |
| UL 94 flame test | V-1 | V-1 | V-- |

|  | Inv. example 4 | Inv. example 5 |
|---|---|---|
| Component A | 59.65% of PA-66 | 49.65% PA-66 |
| Component B | 15% of polyimide B.3 | 15% of polyimide B.3 |
| Component c1 | — | — |
| Component c2 | — | 10 |
| Component D1 | 25% | 25% |
| Component D3c | 0.35 | 0.35 |
| UL 94 flame test | V-2 | V-1 |

|  | Inv. example 6 | Inv. example 7 | Comp. example 6.2 |
|---|---|---|---|
| Component A | 59.65% of PA-6 | 49.65% of PA-6 | 64.65% of PA-6 |
| Component B | 15% of polyimide B.3 | 15% of polyimide B.3 | — |
| Component c1 | — | — | — |
| Component c2 | — | 10% | 10% |
| Component D1 | 25% | 25% | 25% (GF) |
| Component D3b | 0.35 | 0.35 | 0.35 |
| UL 94 flame test | V-2 | V-0 | V-- |

The invention claimed is:

1. A thermoplastic molding composition comprising
   A) from 20 to 98.99% by weight of at least one polyamide,
   B) from 0.01 to 40% by weight of at least one branched polyimide, selected from condensates of either
      b1) at least one polyisocyanate having an average of more than two isocyanate groups per molecule or
      b2) at least one polyamine having an average of more than two amino groups per molecule with
      b3) at least one polycarboxylic acid having at least three COOH groups per molecule or its anhydride,
   C) from 1 to 59% by weight of at least one flame retardant selected from the group of
      c1) the phosphorus-containing flame retardants
      c2) the nitrogen-containing flame retardants
      and mixtures of these,
   D) from 0 to 50% by weight of further additives,
   where the total of the proportions by weight does not exceed 100% based on the molding composition.

2. The thermoplastic molding composition according to claim 1, wherein the polycarboxylic acid (b3) comprises a polycarboxylic acid having at least four COOH groups per molecule or the relevant anhydride.

3. The thermoplastic molding composition according to claim 1, wherein the polyisocyanate (b1) has been selected from oligomeric hexamethylene diisocyanate, oligomeric tetramethylene diisocyanate, oligomeric isophorone diisocyanate, oligomeric diphenylmethane diisocyanate, trimeric tolylene diisocyanate and mixtures of the abovementioned polyisocyanates.

4. The thermoplastic molding composition according to claim 1, where the polyimide (B) is selected from polyimides which have a molar mass $M_w$ of from 1000 to 200 000 g/mol.

5. The thermoplastic molding composition according to claim 1, where the polydispersity $M_w/M_n$ of the polyimide (B) is at least 1.4.

6. The thermoplastic molding composition according to claim 1, where the degree of branching of the polyimide (B) is from 10 to 99.9%.

7. The thermoplastic molding composition according to claim 1, where the nitrogen-containing flame retardant c2) used comprises a heterocyclic compound which comprises at least one nitrogen atom.

8. A coating material comprising the thermoplastic molding composition according to claim 1.

9. A fiber, foil or molding comprising a thermoplastic molding composition according to claim 1.

* * * * *